US00RE40732E

(19) United States
(12) Reissued Patent
Jeon et al.

(10) Patent Number: US RE40,732 E
(45) Date of Reissued Patent: Jun. 16, 2009

(54) METHOD FOR CONTROLLING WASHING DURING SPINNING IN TILT-TYPE WASHING MACHINE FOR ATTENUATION OF VIBRATION

(75) Inventors: Si Moon Jeon, Seoul (KR); Young Hwan Park, Seoul (KR); Oh Hun Kwon, Seoul (KR); Kyung Hwan Kim, Seoul (KR); Dong Won Kim, Seoul (KR); Tae Hee Lee, Seoul (KR)

(73) Assignee: LG Electronics Inc., Seoul (KR)

(21) Appl. No.: 10/864,919

(22) Filed: Jun. 10, 2004

Related U.S. Patent Documents

Reissue of:
(64) Patent No.: 6,401,284
Issued: Jun. 11, 2002
Appl. No.: 09/709,549
Filed: Nov. 13, 2000

(30) Foreign Application Priority Data

Apr. 4, 2000 (KR) ..... 2000-17663
May 4, 2000 (KR) ..... 2000-24039

(51) Int. Cl.
*D06F 37/20* (2006.01)

(52) U.S. Cl. ..... 8/158; 8/159; 68/24; 68/23.1; 68/140

(58) Field of Classification Search ..... 8/158, 8/159; 68/23 R, 23.1, 23.2, 23.3, 23.5, 23.6, 68/24, 25, 58, 140
See application file for complete search history.

(56) References Cited

U.S. PATENT DOCUMENTS 1,566,312 A * 12/1925 Coates ..... 68/184
2,165,884 A * 7/1939 Chamberlin et al. ..... 8/159

(Continued)

FOREIGN PATENT DOCUMENTS

| | | | |
|---|---|---|---|
| DE | 3143140 | | 5/1983 |
| EP | 0263742 | | 4/1988 |
| FR | 2 501 736 | * | 9/1982 |
| JP | 51-17373 | | 7/1974 |
| JP | 60-41987 | * | 3/1985 |
| JP | 6045388 | * | 3/1985 |
| JP | 2-249591 | | 10/1990 |
| JP | 3-168183 | * | 7/1991 |
| JP | 3-264089 | * | 11/1991 |
| JP | 3-289998 | * | 12/1991 |
| JP | 4-141192 | * | 5/1992 |
| JP | 4-150894 | * | 5/1992 |

(Continued)

*Primary Examiner*—Frankie L Stinson
(74) *Attorney, Agent, or Firm*—Greenblum & Bernstein, P.L.C.

(57) ABSTRACT

Method for controlling washing during spinning in a tilt-type washing machine for attenuation of vibration, including (a) a main rotation step for exerting a centrifugal force to the laundry gathered to a center of the inner tub for spreading the laundry to an inside wall of the inner tub before the water discharging step, (b) a laundry disentangle alternately rotating step for alternately rotating the inner tub for a preset times to disentangle the laundry spread to the inside wall of the inner tub, and (c) a supplementary rotating step for rotating the inner tub at a preset RPM to keep the laundry in the tilted inner tub spread evenly during the water discharge step, or alternatively (a) a laundry disentangle alternately rotating step for alternately rotating the inner tub to eliminate the eccentricity of the laundry in the inner tub before the water discharge step, and (b) a determining step either for carrying out a control pattern to eliminate the eccentricity of the laundry if the eccentricity of the laundry after the step (a) is greater than a preset value, or for proceeding to the water discharging step if the eccentricity of the laundry after the step (a) is smaller than the preset value, whereby attenuating the vibration to the minimum.

33 Claims, 10 Drawing Sheets

U.S. PATENT DOCUMENTS

| | | | | | |
|---|---|---|---|---|---|
| 2,450,262 | A | * | 9/1948 | Winslow | 474/2 |
| 2,867,107 | A | * | 1/1959 | Brown | 68/24 |
| 2,972,510 | A | * | 2/1961 | Buss et al. | 8/159 |
| 3,102,407 | A | * | 9/1963 | Stilwell, Jr. | 68/17 R |
| 3,248,908 | A | * | 5/1966 | Pope | 68/12.16 |
| 3,270,529 | A | * | 9/1966 | Engel | 68/18 F |
| 3,273,361 | A | * | 9/1966 | Smith | 68/12.06 |
| 3,548,615 | A | * | 12/1970 | Ohnishi et al. | 68/23.1 |
| 3,640,098 | A | * | 2/1972 | Eastall | 68/12.06 |
| 4,080,165 | A | | 3/1978 | Thompson | |
| 4,114,406 | A | | 9/1978 | Horowitz et al. | |
| 4,165,994 | A | | 8/1979 | Jackson | |
| 4,835,993 | A | | 6/1989 | Dreher | |
| 5,038,586 | A | * | 8/1991 | Nukaga et al. | 68/12.01 |
| 5,207,764 | A | * | 5/1993 | Akabane et al. | 68/20 |
| 5,293,760 | A | * | 3/1994 | Tani et al. | 68/12.02 |
| 5,301,523 | A | * | 4/1994 | Payne et al. | 68/12.16 |
| 5,327,603 | A | | 7/1994 | Roh et al. | |
| 5,560,061 | A | * | 10/1996 | Wentzlaff et al. | 8/159 |
| 5,601,061 | A | * | 2/1997 | Dam et al. | 123/298 |
| 5,692,313 | A | * | 12/1997 | Ikeda et al. | 34/58 |
| 5,768,730 | A | * | 6/1998 | Matsumoto et al. | 8/159 |
| 5,870,905 | A | * | 2/1999 | Imamura et al. | 68/12.04 |
| 5,970,555 | A | * | 10/1999 | Baek et al. | 8/159 |
| 6,000,248 | A | | 12/1999 | Erickson et al. | |
| 6,023,854 | A | * | 2/2000 | Tsunomoto et al. | 34/531 |
| 6,029,300 | A | * | 2/2000 | Kawaguchi et al. | 8/159 |
| 6,092,400 | A | | 7/2000 | Sumner et al. | |
| 6,122,843 | A | | 9/2000 | Noguchi et al. | |
| 6,286,344 | B1 | | 9/2001 | Jeon et al. | |
| 6,311,527 | B1 | | 11/2001 | Monteiro et al. | |
| 6,393,873 | B1 | * | 5/2002 | Myerscough | 68/58 |

FOREIGN PATENT DOCUMENTS

| | | | |
|---|---|---|---|
| JP | 4-215796 | * | 8/1992 |
| JP | 4-297298 | | 10/1992 |
| JP | 4-322698 | | 11/1992 |
| JP | 5-15689 | * | 1/1993 |
| JP | 5-220294 | * | 8/1993 |
| JP | 6-47191 | * | 2/1994 |
| JP | 6-254294 | * | 9/1994 |
| JP | 9-299678 | | 11/1997 |
| JP | 2000-51579 | * | 2/2000 |
| WO | 99/54539 | | 10/1999 |

* cited by examiner

METHOD FOR CONTROLLING WASHING DURING SPINNING IN TILT-TYPE WASHING MACHINE FOR ATTENUATION OF VIBRATION

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a Reissue of U.S. Pat. No. 6,401,284, which was granted on Jun. 11, 2002, based upon U.S. application Ser. No. 09/709,549, filed Nov. 13, 2000.*

BACKGROUND OF THE INVENTION

1. Field of the Invention

The present invention relates to a tilt-type washing machine, and more particularly, to a method for controlling washing during spinning in a tilt-type washing machine for attenuation of vibration.

2. Background of the Related Art

In general, the necessity for the tilt-type washing machine, having the vertical type washing machine and the drum type washing machine applied thereto, is in increasing trend day by day because the tilt-type washing machine has an excellent washing performance and convenience of use. Referring to FIG. 1, a related art tilt-type washing machine is provided with a body 1, an outer tub 2 mounted tilted in the body, an inner tub 3 rotatably mounted in the outer tub, a driving device 4 for applying a rotating force to the inner tub. Moreover, there is a water supply device 5 for supplying washing water to the inner tub 3, and a water discharging device 6 for discharging water from the inner tub to outside of the washing machine. The operation of the tilt-type washing machine proceeds in an order of a washing cycle, a rinsing cycle, an a spinning cycle, of which respective cycles will be explained.

First, the washing cycle has a water supplying step for operating the water supplying device to supply water to the inner tub 3, a washing step for operating the driving device 4 to wash laundry in the inner tub by using a penetrating force of water circulation occurred by rotation of the inner tub, and a dissolving action of detergent, together with a friction force of water circulation caused by reverse/regular direction rotation of the inner tub, a water discharging step for operating the water discharging device 6 to discharge waste water in the inner tub to outside of the washing machine, and a spinning step for rotating a motor in the driving device at a high speed, to extract the waste water from the laundry by using a centrifugal force generated by the high speed rotation of the inner tub.

Second, the rinsing cycle has a water supplying step for operating the water supplying device 5 to supply water to the inner tub 3, a rinsing step for operating the driving device 4 to remove detergent and dirt stuck to the laundry by using water circulation generated at rotation of the inner tub, a water discharging step for operating the water discharging device 6 to extract the waste water in the inner tub to outside of the washing machine, and a spinning step for operating the motor of the driving device at a high speed to extract the waste water in the laundry by using a centrifugal force generated by the high speed rotation of the inner tub. The foregoing steps may be repeated for a few times as required.

Third, the spinning cycle has a spinning step for driving the motor in the driving device 4 at a high speed to extract the water in the laundry by using a centrifugal force generated at a high speed rotation of the inner tub 3, and a water discharging step for operating the water discharging device 6 to discharge the water in the inner tub, which is proceeded on the same time with the spinning step.

However, the related art tilt-type washing machine has the following problems.

First, the washing step or the rinsing step before the water discharging step has the following problems, when, in one side the washing or rinsing is made as the washing water penetrates the laundry by the centrifugal force generated at rotation of the driving motor, and in the other side the washing or rinsing is made as the washing water and the laundry make friction to each other as the washing water circulation is inversed following regular/reverse direction rotation of the driving motor.

Referring to FIG. 2A, as the inner tub 3 rotates in a regular/reverse direction alternately, the laundry is gathered to a central region of the inner tub due to a difference of water circulations between a center and an inside wall side of the inner tub, and entangled to one another as a speed of the alternating rotation of the inner tub increases, which causes a strong turbulence. Consequently, the water discharging step and the spinning step carried out in a state the laundry is entangled leads the entangled laundry stuck to the inside wall of the inner tub in the spinning step, without being distributed evenly on the inside wall of the inner tub, which causes eccentricity of a weight that is a cause of a vibration. At the end, the walking phenomenon is occurred, in which the body 1 moves violently in the spinning. Second, at an end of the washing cycle or the rinsing cycle, the penetration washing or rinsing using the centrifugal force generated at the rotation of the driving motor comes to an end, and distribution of the laundry in the tilted inner tub 3 becomes proportional to a distribution of the water. That is, as shown in FIG. 2B, much of the laundry is disposed at a region away from a center of rotation, to settle at a lowest region of the inner tub, a region away from the rotation center, by its own weight as shown in FIG. 2C after the water discharging step is carried out, which induces eccentricity of weight that may cause vibration during the spinning cycle after the water discharging cycle. At the end, the walking phenomenon is occurred, in which the body 1 moves violently in the spinning.

SUMMARY OF THE INVENTION

Accordingly, the present invention is directed to a method for controlling washing during spinning in a tilt-type washing machine for attenuation of vibration that substantially obviates one or more of the problems due to limitations and disadvantages of the related art.

An object of the present invention is to provide a method for controlling washing during spinning in a tilt-type washing machine for attenuation of vibration, in which the vibration is minimized.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for controlling washing during spinning in a tilt-type washing machine for attenuation of vibration, including a washing cycle having a water supplying step-an alternately rotating(washing) step-a water discharging step-a spinning step, a rinsing cycle having a preset times of repetition of a series of steps with a water supplying step-an alternately rotating (rinsing) step-a water discharging step-a spinning step, and a spinning cycle having a spinning step for carrying out a main water extraction, which are proceeded in a sequence, the method includes (a) a main rotation step for exerting a centrifugal force to the laundry gathered to a center of the inner tub for spreading the laundry to an inside wall of the inner tub before the water discharging step, (b) a laundry disentangle alternately rotating step for alternately rotating the inner tub for a preset times to disentangle the laundry spread to the inside wall of the inner tub, and (c) a supplementary rotating step for rotating the inner tub at a preset RPM to keep the laundry in the tilted inner tub spread evenly during the water discharge step.

In another aspect of the present invention, there is provided a method for controlling washing during spinning in a tilt-type washing machine for attenuation of vibration, including a washing cycle having a water supplying step-an alternately rotating(washing) step-a water discharging step-a spinning step, a rinsing cycle having a preset times of repetition of a series of steps with a water supplying step-an alternate rotating(rinsing) step-a water discharging step-a spinning step, and a spinning cycle having a spinning step for carrying out a main water extraction, which are proceeded in a sequence, the method includes (a) a laundry disentangle alternately rotating step for alternately rotating the inner tub to eliminate the eccentricity of the laundry in the inner tub before the water discharge step, and (b) a determining step either for carrying out a control pattern to eliminate the eccentricity of the laundry if the eccentricity of the laundry after the step (a) is greater than a preset value, or for proceeding to the water discharging step if the eccentricity of the laundry after the step (a) is smaller than the preset value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 3:
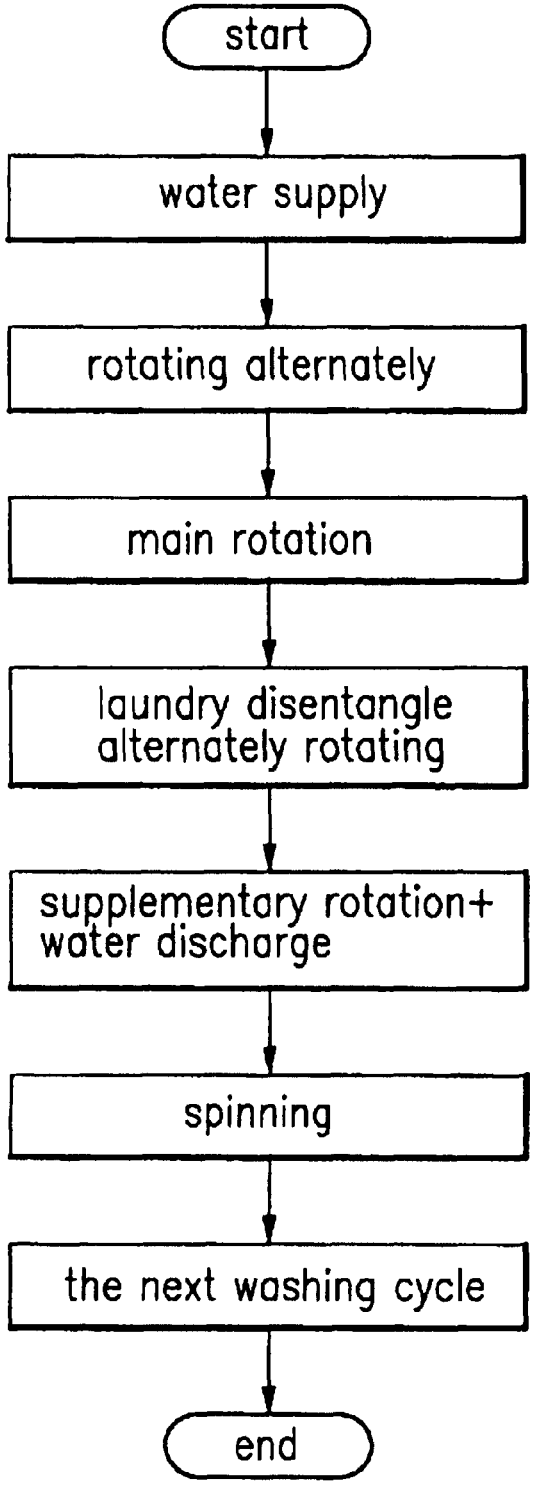
FIG. 3 illustrates a flow chart showing the steps of a method for controlling washing for attenuation of vibration in accordance with a first preferred embodiment of the present invention.
Figure 4A:
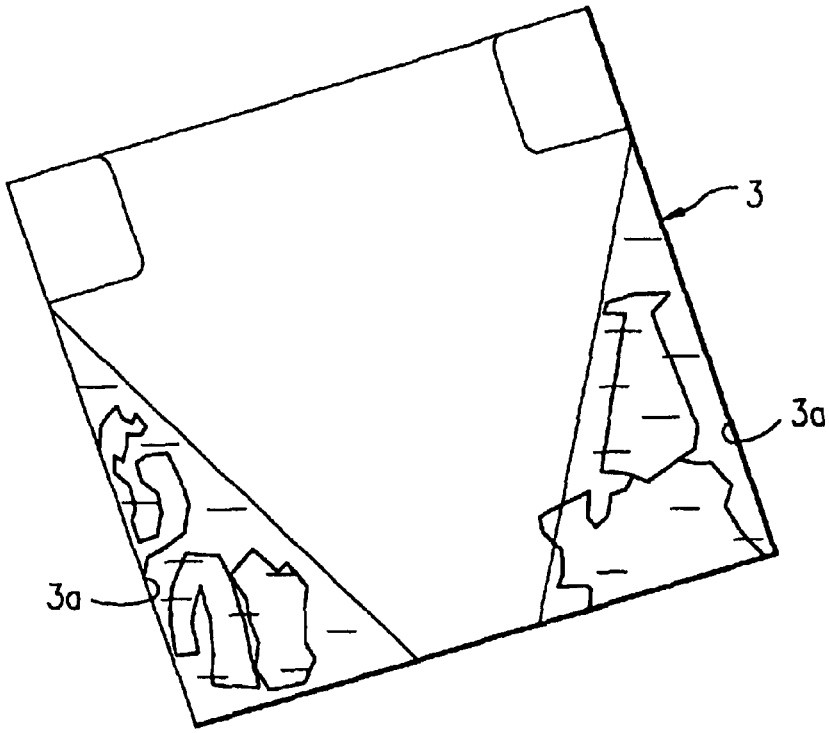
FIG. 4A illustrates a distribution of laundry caused by the one directionally rotating step in FIG. 3, schematically.
Figure 4B:
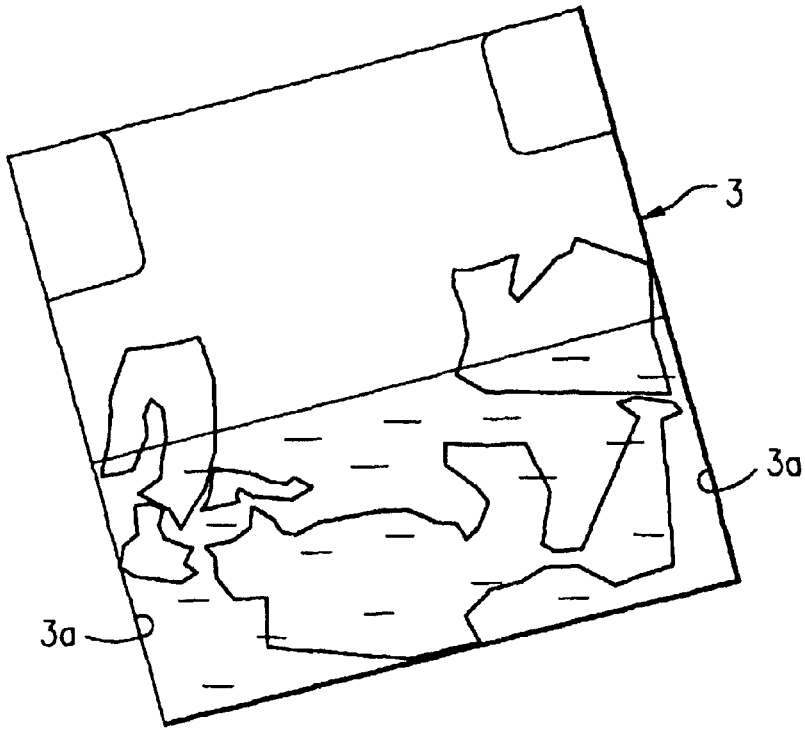
FIG. 4B illustrates a distribution of laundry caused by the laundry disentangle alternately rotating step in FIG. 3, schematically.

Reference will now be made in detail to the preferred embodiments of the present invention, examples of which are illustrated in the accompanying drawings. Components identical to the related art will be given the same names and the same reference symbols, and explanations of which will be omitted. The method for controlling washing for attenuation of vibration in accordance with a first preferred embodiment of the present invention will be explained with reference to FIGS. 3–5. FIG. 3 illustrates a flow chart showing the steps of a method for controlling washing for attenuation of vibration in accordance with a first preferred embodiment of the present invention. FIG. 4A illustrates a distribution of laundry caused by the one directionally rotating step in FIG. 3 schematically, FIG. 4B illustrates a distribution of laundry caused by the laundry disentangle alternately rotating step in FIG. 3 schematically, FIG. 4C illustrates a distribution of laundry caused by the supplementary rotating step and the water discharging step in FIG. 3 schematically, and FIG. 5 illustrates a graph showing a comparison of vibrations of a tilt-type washing machine 'B' having the first preferred embodiment of the present invention applied thereto and a tilt-type washing machine 'C' having the related art applied thereto, with reference to a vibration of the vertical type washing machine 'A', which is taken as 100%.

Referring to FIG. 3, the method for controlling washing for attenuation of vibration in accordance with a first preferred embodiment of the present invention includes, before carrying out a water discharge step, a main rotating step for exerting a centrifugal force to laundry to spread the laundry gathered and entangled at a central region of the inner tub 3 caused by the alternating rotation in the washing or rinsing step to an inside wall of the inner tub 3, and a laundry disentangle alternately rotating step for rotating the inner tub alternately for a preset times to disentangle the laundry dispersed to the inner tub. In this instance, it is preferable that a number of times of the alternate rotation in the laundry disentangle alternately rotating step is set to be below 10 times for preventing the laundry from being entangled, again.

Figure 4C:
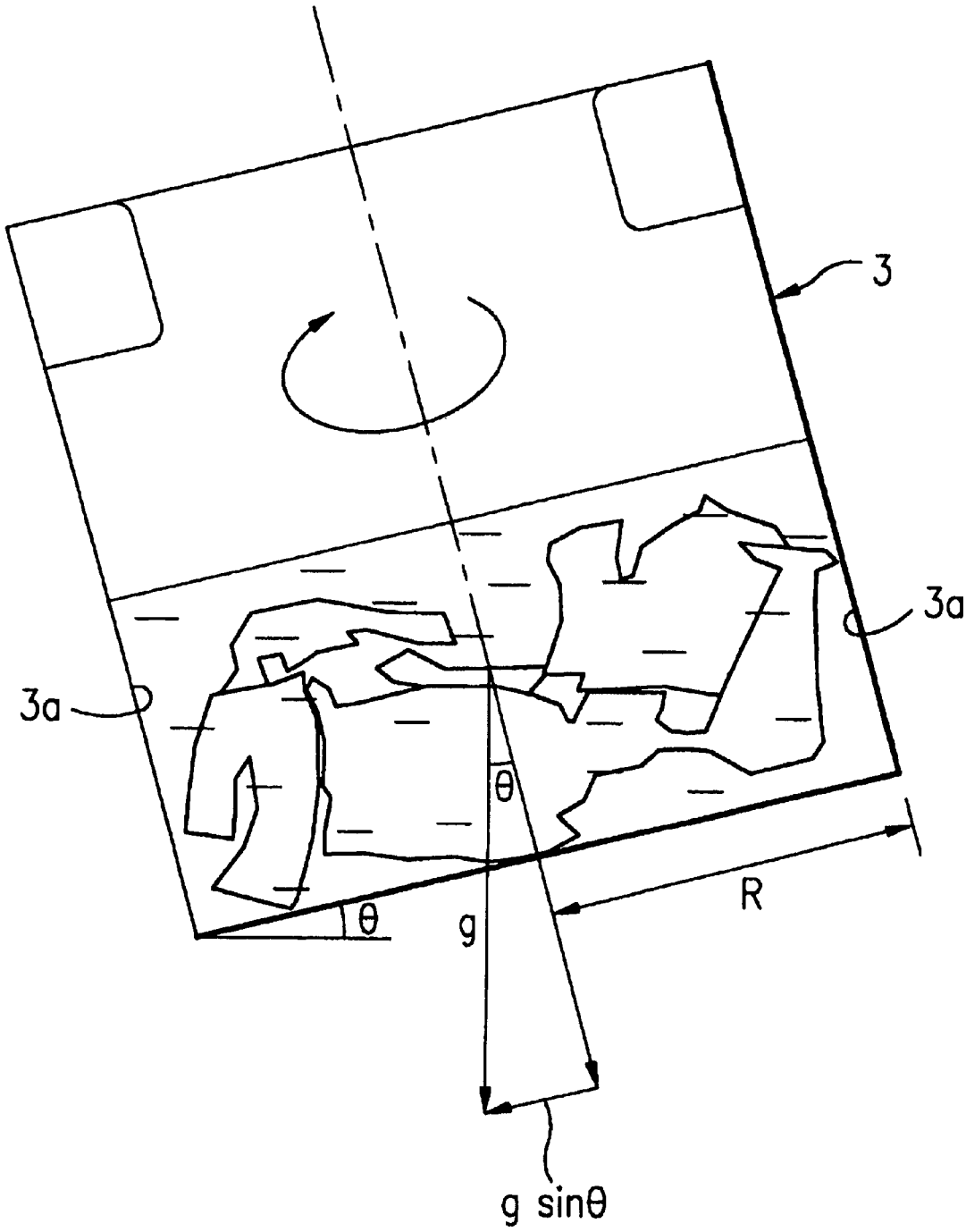
FIG. 4C illustrates a distribution of laundry caused by the supplementary rotating step and the water discharging step in FIG. 3, schematically.
Figure 5:
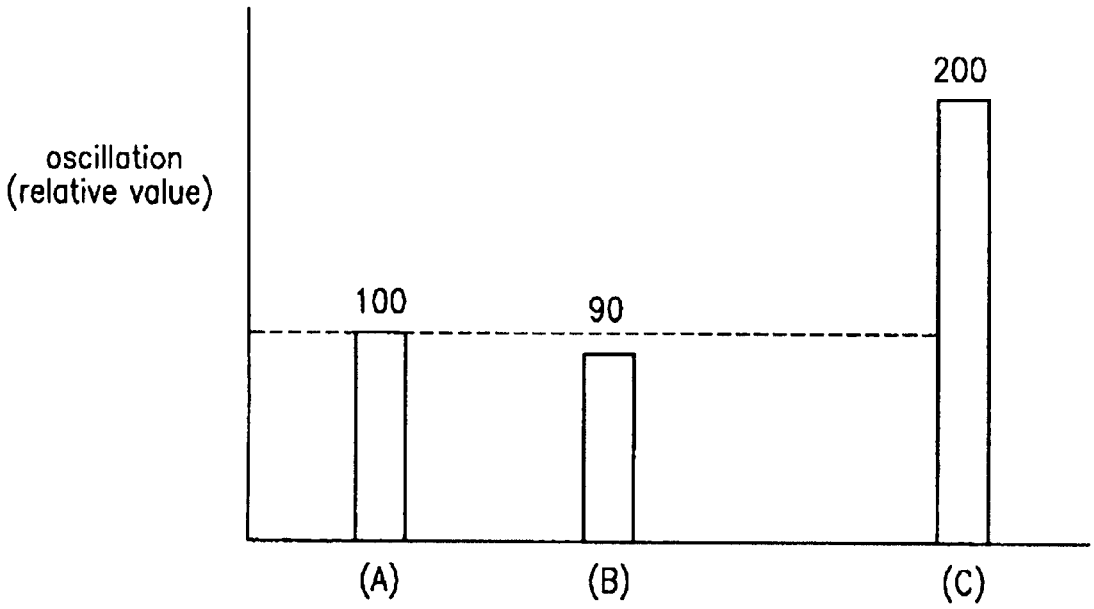
FIG. 5 illustrates a graph showing a comparison of vibrations of a tilt-type washing machine 'B' having the first preferred embodiment of the present invention applied thereto and a tilt-type washing machine 'C' having the related art applied thereto, with reference to a vibration of the vertical type washing machine 'A', which is taken as 100%.

Along with this, referring to FIG. 4C, in order to keep the laundry evenly distributed in the tilted inner tub 3 during the water discharging step, it is preferable that the first embodiment method of the present invention further includes a supplementary rotating step for rotating the inner tub at a preset RPM. The supplementary rotating step utilizes a principle that a radial acceleration becomes the greater as it goes the farther from a center of rotation of the inner tub when the inner tub 3 rotates at a fixed angular speed, which may be explained in detail, as follows.

When it is assumed that a radius of the inner tub 3 is 'R', and a tilted angle of the inner tub with respect to the ground is 'θ', a maximum radial acceleration exerting to the laundry on an inside wall 3a of the inner tub is $R\omega^2$, an average radial acceleration exerting to the laundry at a half way to the inside wall 3a is $\frac{1}{2}(R\omega^2)$, and a gravitational acceleration exerting to the laundry in the inner tub is $g \sin \theta$. If the inner tub 3 is rotated at an angular speed $\omega=\sqrt{2 \sin \theta)/R}$, when the gravitational acceleration is equal to the average radial acceleration, the gravitational acceleration moves the laundry disposed within a ½R region(hereafter called as 'a central region of the inner tub') of the inner tub toward a direction of the gravitational acceleration, a radial acceleration (hereafter called as 'peripheral radial acceleration') greater than the gravitational acceleration(or the average radial acceleration) but smaller than the maximum radial acceleration moves the laundry disposed between the ½R region to a R region('a peripheral region in the inner tub') toward a direction of the radial acceleration. That is, it can be known that the laundry dispersed in the laundry disentangle alternately rotating step is subjected to different acceleration depending on positions of the laundry in the inner tub 3 in the supplementary rotating step. Consequently, as the laundry at the central region of the inner tub tends to move toward a bottom of the inner tub by the gravitational acceleration, while the laundry at the peripheral region in the inner tub tends to move toward an inside wall 3a of the inner tub by the radial acceleration, the entire laundry in the inner tub can be spread evenly in the inner tub 3 because the laundry even at the central portion is pulled toward the inside wall of the inner tub by the radial acceleration exerting on a portion of the same laundry presented in the peripheral region of the inner tub.

In the meantime, it is preferable that the tilted inner tub 3 of the present invention is rotated at 30~50 RPM in the supplementary rotating step, which can be obtained under the following condition and equation.

The radius 'R' of the inner tub used in the present invention is approx. 0.25–0.3 m, and the tilt angle with respect to the ground is approx. 10–15°.

$$(\tfrac{1}{2})R\omega^2=g \sin \theta$$

$$\therefore \omega=\sqrt{(2 g \sin \theta)R},$$

and, $\omega$=x RPM, and $x=(60 \sec/2\pi)\omega$.

Accordingly, it can be known that the angular speed of the inner tub is approx. 30 RPM~50 RPM, when the above condition is substituted. And, the (½)R of the inner tub taken as a reference for dividing the central region and the peripheral region of the inner tub is given, not for confining the present invention, but for clear expression of the present invention. That is, within a scope of the invention, the reference may be any point between the center of the inner tub 3 to the inside wall 3a of the inner tub.

The operation of the method for controlling washing during spinning in a tilt-type washing machine for attenuation of vibration will be explained.

In the main rotating step, the laundry is moved to the inside wall 3a of the inner tub by the centrifugal force(see FIG. 4A). According to this, the problem in the related art can be prevented, in which the laundry is gathered at a place in the inner tub at the times the alternately rotating steps (washing or rinsing step) are finished. And, in the laundry disentangle alternately rotating step, the laundry is disentangled to spread evenly in the inner tub 3 (see FIG. 4B). Eventually, the related art problem of the eccentricity of weight caused by entangled laundry in the spinning step can be prevented in advance. Along with this, if the supplementary rotating step and the water discharging step are carried out on the same time, the laundry is kept to spread evenly in the inner tub 3 (see FIG. 4C), and settled on the bottom of the inner tub upon finishing the water discharge step. According to this, the related art problem of gathering of the laundry to one place in the water discharging step can be prevented in advance. Therefore, provided that the aforementioned series of process is carried out, the vibration caused by the eccentricity in the spinning step, when the inner tub 3 is rotated at a high speed, can be reduced. That is, as shown in FIG. 5, if it is assumed that a vibration of a vertical washing machine 'A' is 100%, vibrations of the tilt type washing machine having the first embodiment method of the present invention applied thereto 'B' and the tilt type washing machine having the related art method applied thereto 'C' are compared to find that the vibration of the tilt type washing machine having the first embodiment method of the present invention applied thereto 'B' shows a significant reduction of the vibration.

Figure 6:
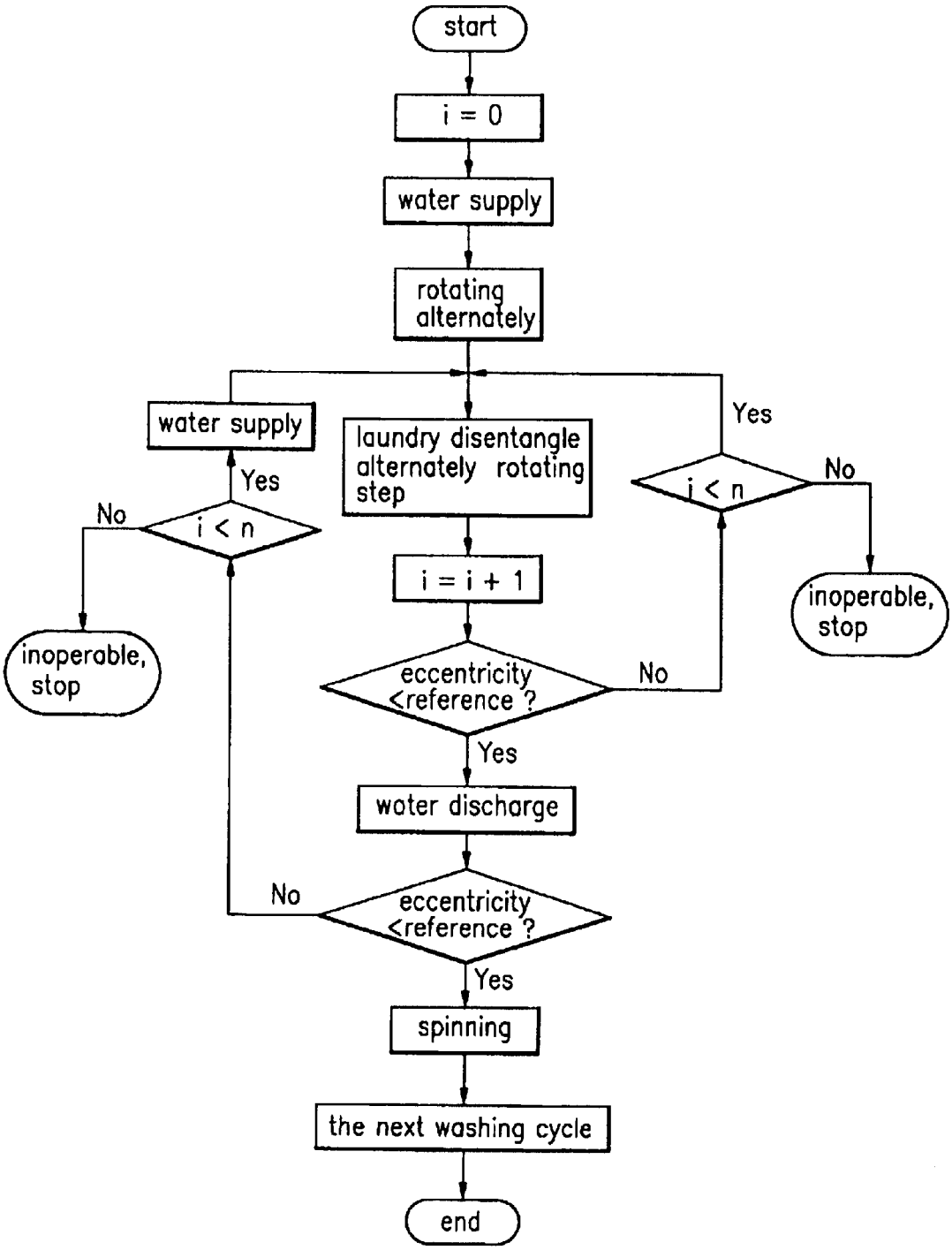
FIG. 6 illustrates a flow chart showing the steps of a method for controlling washing for attenuation of vibration in accordance with a second preferred embodiment of the present invention.
Figure 7:
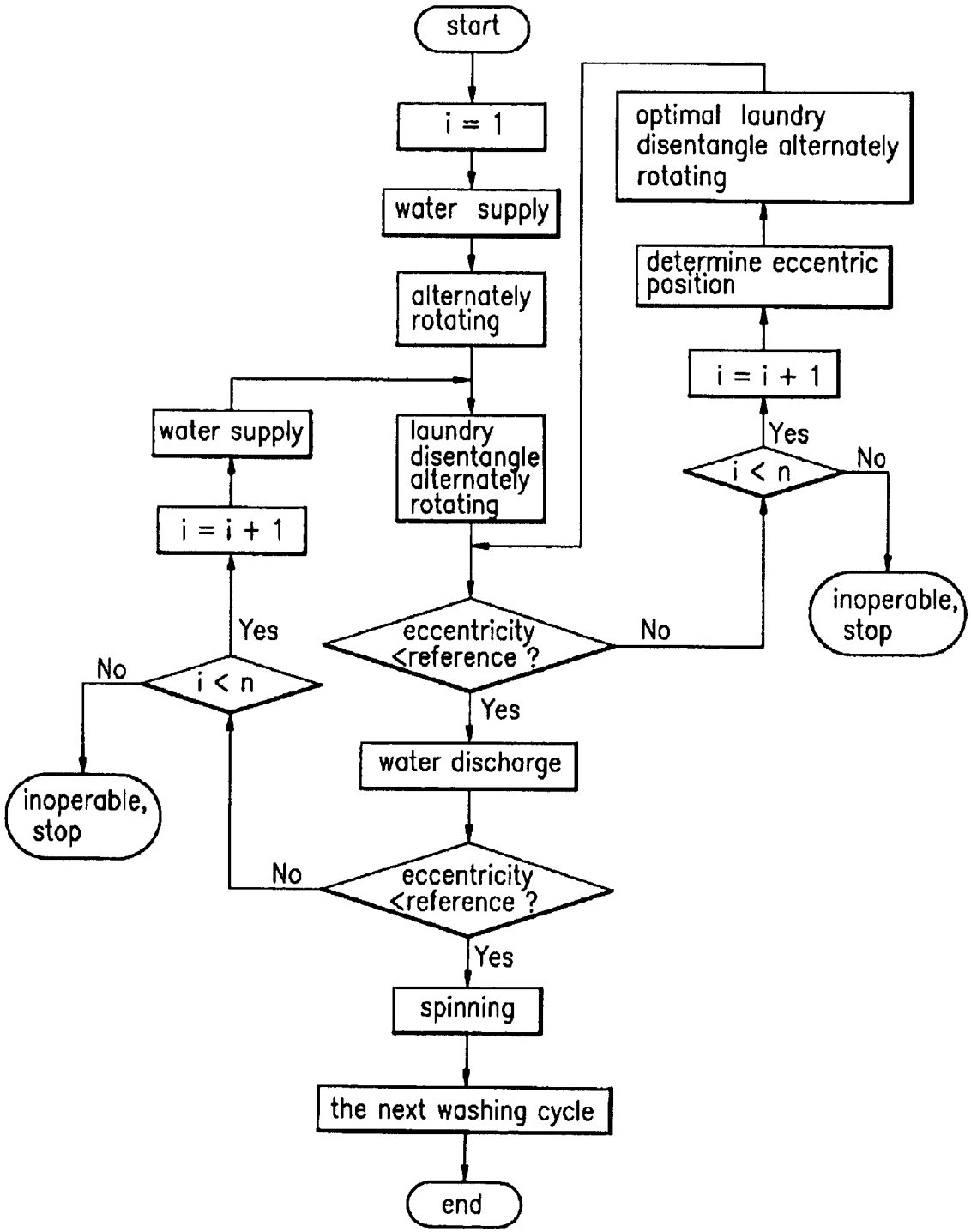
FIG. 7 illustrates a flow chart showing the steps of a variation of the method in FIG. 6; and, FIG. 8 illustrates a graph showing a comparison of rocking components of an inner tub occurred when the inner tub is rotated at a constant speed for vertical type and tilt-type washing machines, respectively.
Figure 8:
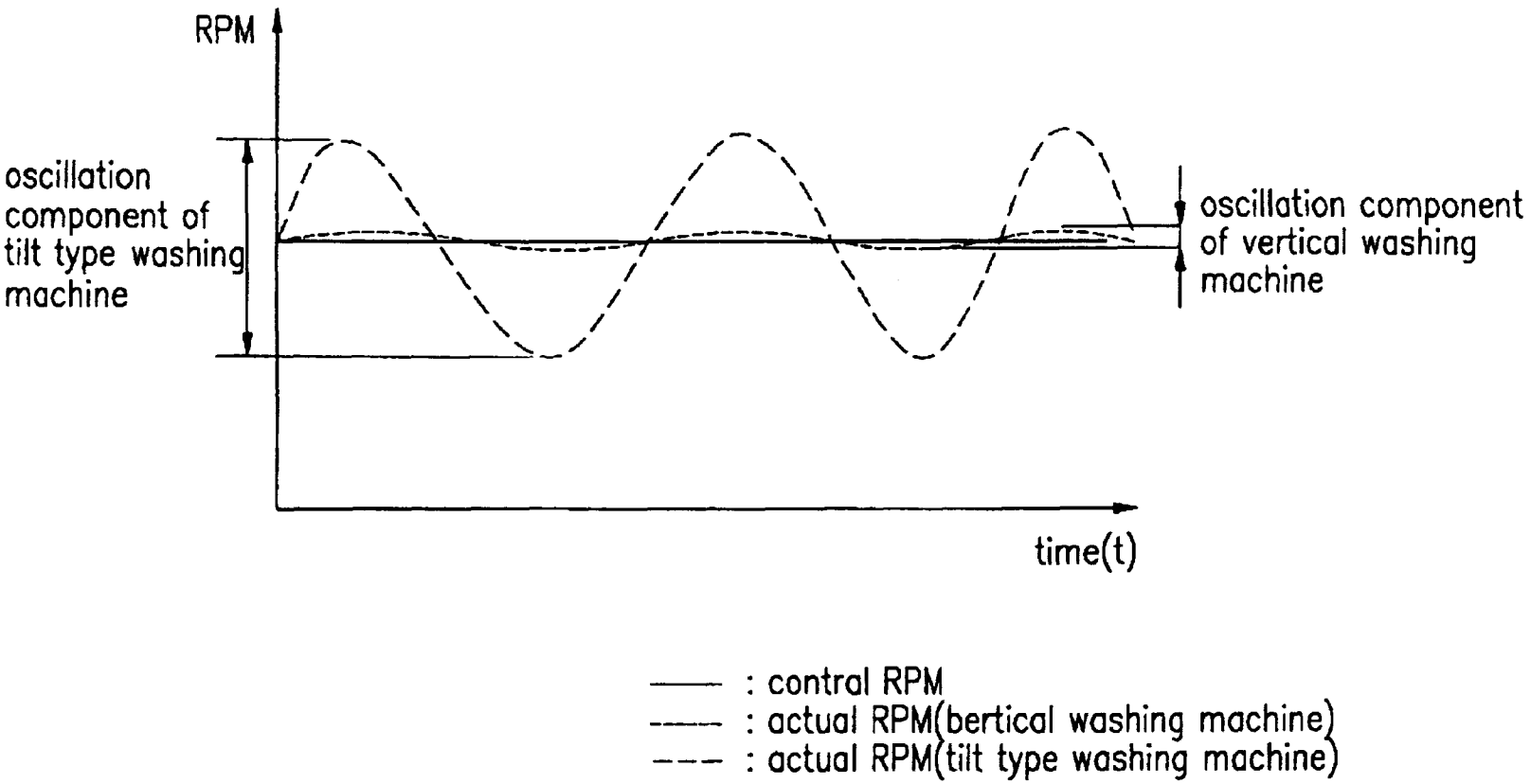

FIG. 6 illustrates a flow chart showing the steps of a method for controlling washing for attenuation of vibration in accordance with a second preferred embodiment of the present invention, FIG. 7 illustrates a flow chart showing the steps of a variation of the method in FIG. 6, and FIG. 8 illustrates a graph showing a comparison of rocking components of an inner tub occurred when the inner tub is rotated at a constant speed for vertical type and tilt-type washing machines, respectively.

Figure 1:
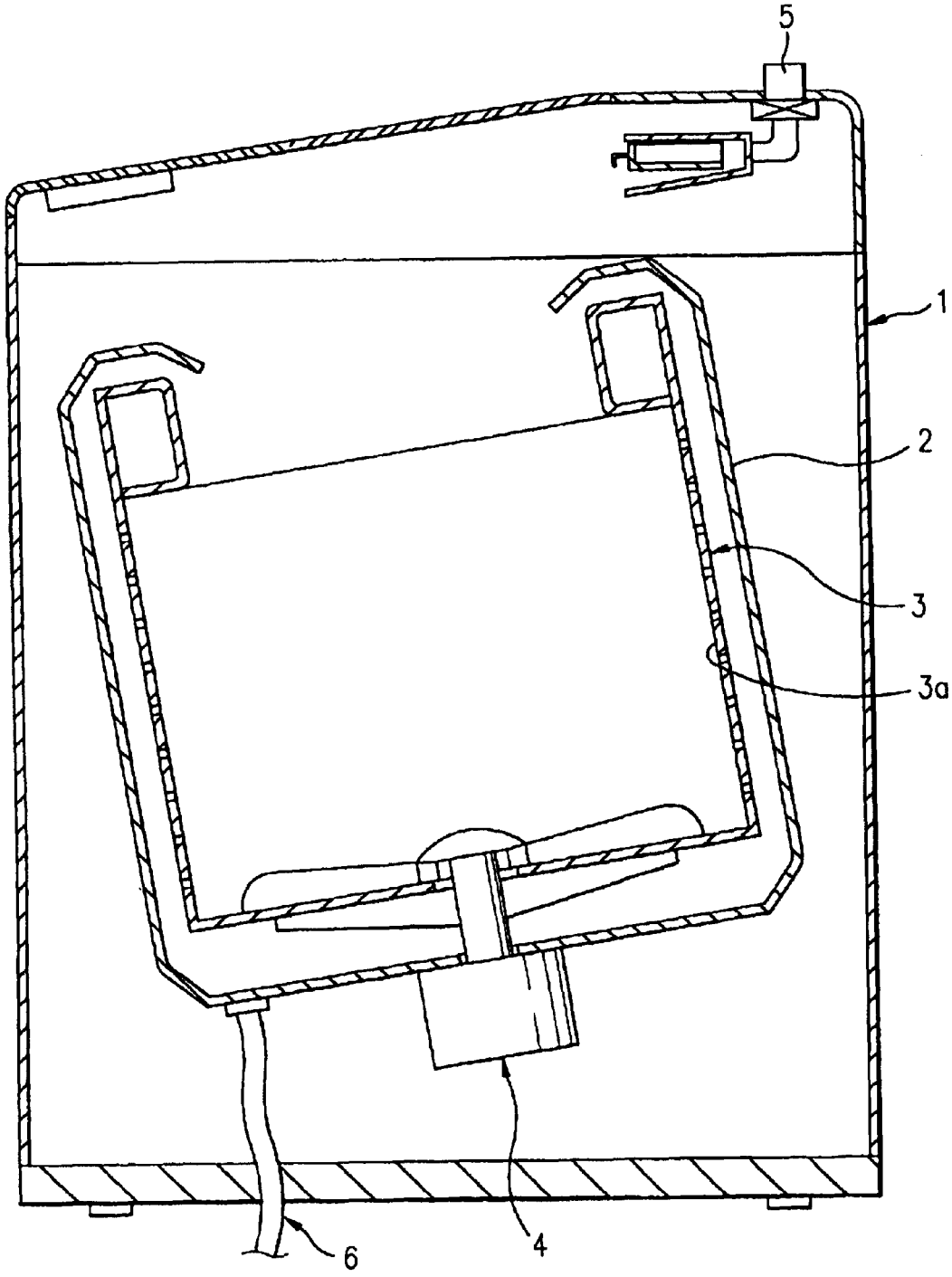
FIG. 1 Related Art
FIG. 1 illustrates a section of a related art tilt-type washing machine.
Figure 2A:
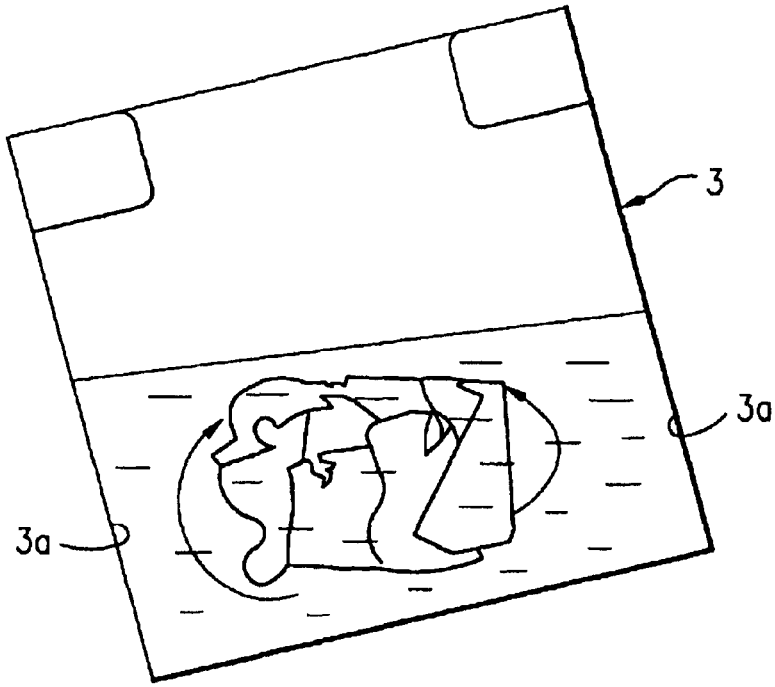
FIG. 2A Related Art
FIG. 2A illustrates entangled laundry at a central region of an inner tub before a related art water discharging step, schematically.
Figure 2B:
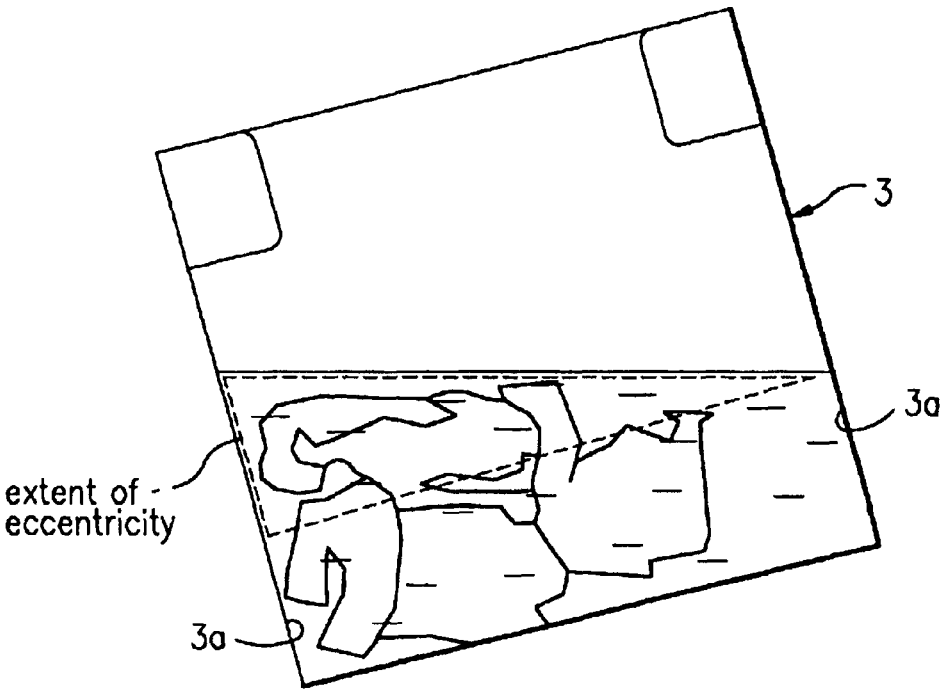
FIG. 2B Related Art
FIG. 2B illustrates laundry gathered to a spot in an inner tub where much of the water is distributed according to a distribution of water before a related art water discharging step is carried out, schematically.
Figure 2C:
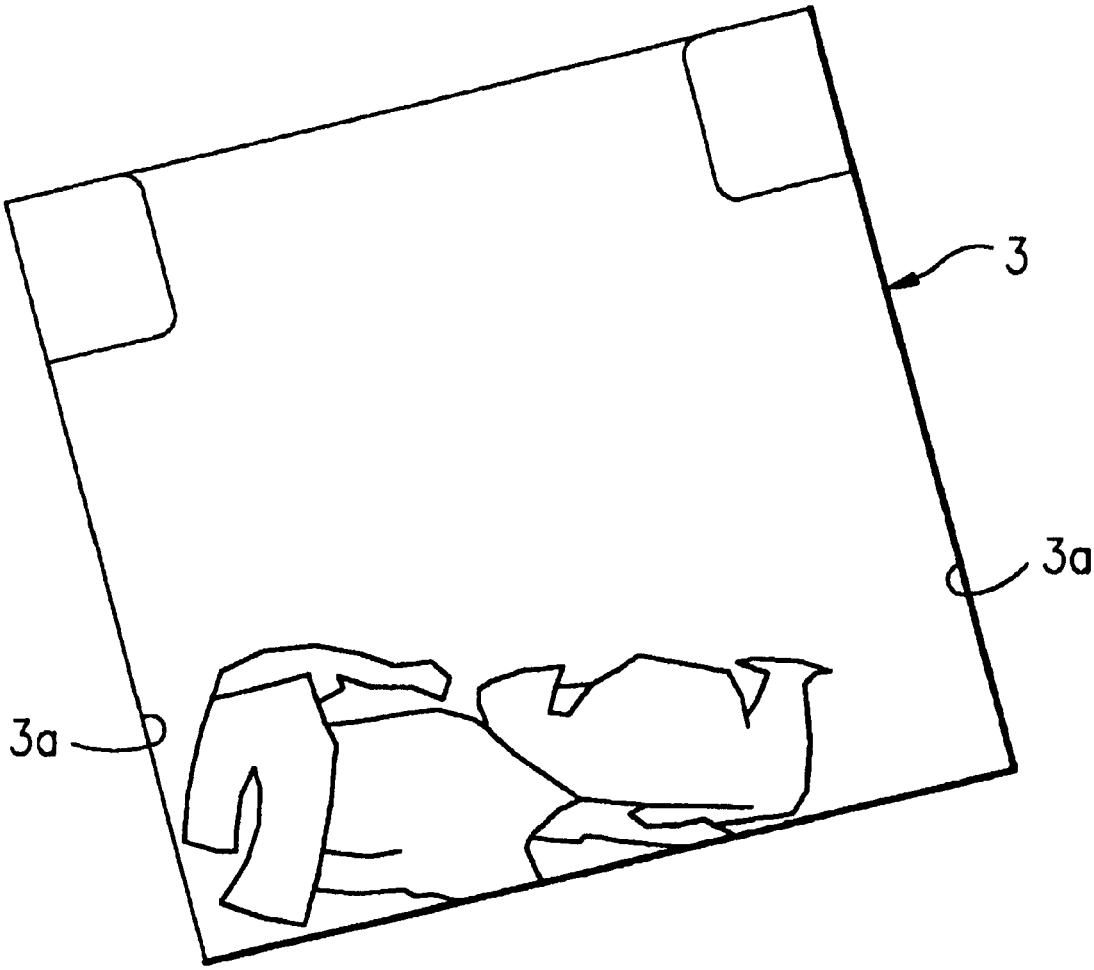
FIG. 2C Related Art
FIG. 2C illustrates a state of laundry gathered to one side of an inner tub after a related art water discharging step, schematically.

Referring to FIGS. 6 and 7, the method for controlling washing for attenuation of vibration in accordance with a second preferred embodiment of the present invention includes before carrying out the water discharging step, a laundry disentangle alternately rotating step for alternately rotating the inner tub to remove eccentricity of the laundry in the inner tub (see 3 in FIG. 2A), and a determining step for detecting an extent of eccentricity of the laundry, and carrying out a control pattern for removing the eccentricity of the laundry if the extent of eccentricity is greater than a preset value, or proceeding to the water discharging step if the extent of eccentricity is smaller than the preset value. As shown in FIG. 6, one embodiment of the control pattern may include a step for carrying out the laundry disentangle alternately rotating step again for reducing the eccentricity of the laundry lower than the preset value, a step for carrying out the determining step again, and a step for automatic stop of the washing if the eccentricity of the laundry is kept greater than the preset value until the foregoing steps are repeated for a preset times. As shown in FIG. 7, another embodiment of the control pattern may include a step for determining an extent, and a position of the laundry, and a step for carrying out an optimal laundry disentangle alternately rotating step centered on the position of the laundry to reduce the eccentricity of the laundry, and a step for automatic stop of the washing if the eccentricity of the laundry is kept greater than the preset value until the foregoing steps are repeated for a preset times. The eccentric position of the laundry is determined to be as a region at which the angular speed of the inner tub 3 is reduced by weight of the eccentric laundry itself when the eccentric laundry is moved upward, and increased by weight of the eccentric laundry itself when the eccentric laundry is moved downward. And, the extent of eccentricity is defined to be a size of oscillating component deviated from a fixed speed when the inner tub 3 is rotated at the fixed speed. As shown in FIG. 8, a reliability of the determination is assured since the oscillation component of the tilt type washing machine is significantly greater than the vertical type washing machine. In the meantime, it is preferable that the another embodiment of the control pattern further includes a step of detecting the extent of eccentricity of the laundry after the water discharging step is carried out, to carry out a supplementary control pattern for eliminating the eccentricity of the laundry if the extent of the eccentricity of the laundry is greater than a present value, or proceeding to the spinning step if the extent of the eccentricity of the laundry is smaller than the present value. The supplementary control pattern includes the steps of supplying water to the inner tub 3, carrying out the laundry disentangle alternately rotating step again for eliminating the eccentricity of the laundry, carrying out the determining step again, carrying out the water discharging step again, carrying out the supplementary determining step again, and automatic stop of the washing if the eccentricity of the laundry is kept greater than the preset value until the foregoing steps are repeated for a preset times. Along with this, in order to spread the laundry in the tilt type inner tub 3 evenly, it is preferable that the water discharging step includes the supplementary rotating step for rotating the tilted inner tub 3 at 30–50 RPM. Explanation of the supplementary rotating step will be omitted as the step is identical to the same described in the first preferred embodiment.

The operation of the foregoing method for controlling washing for attenuation of vibration in accordance with a second preferred embodiment of the present invention will be explained.

Referring to FIGS. 6 and 7, in the laundry disentangle alternately rotating step, the laundry is disentangled and spread in the inner tub (see 3 in FIG. 4B) evenly. And, in the determining step, the extent of eccentricity of the disentangled laundry is detected and measured, and determined to be within a preset value. In this instance, though the operation proceeds to the next step, the water discharging step, if the eccentricity of the laundry is smaller than the preset value, the control pattern is carried out if the eccentricity of the laundry is greater than the preset value.

In the meantime, the control pattern is provided for preventing vibration owing to the eccentricity greater than the preset value, i.e., excessive vibration of the tilt type washing machine during spinning in advance, operation of which embodiments will be explained.

Referring to FIG. 6, in the first embodiment control pattern, the laundry disentangle alternately rotating step is carried out again to spread the laundry in the inner tub 3 evenly for eliminating the eccentricity of the laundry, and the determining step is carried out for detecting, and determining the eccentricity of the laundry. If the eccentricity of the laundry detected in the determining step is smaller than the preset value, though the operation proceeds to the water discharging step, of the eccentricity of the laundry detected in the determining step is greater than the preset value, the laundry disentangle alternately rotating step and the determining step is carried out, again. However, because there may be such occasion that an operation time period of the washing machine is prolonged, or the washing machine is overloaded, if the foregoing steps are repeated for many times, the repetition of the foregoing steps are limited to a preset times, when the washing is ended.

Referring to FIG. 7, in the second embodiment control pattern, for eliminating the eccentricity of the laundry, after determining the extent and position of eccentricity of the laundry, the optimal laundry disentangle alternate rotating is carried out, to spread the laundry in the inner tub evenly, and the extent of eccentricity of the laundry is detected and determined again. In this instance, though the operation proceeds to the water discharging step if the eccentricity of the laundry detected in the determining step is smaller than the preset value, the operation proceeds to the step for determining the eccentric position of the laundry, the optimal laundry disentangle alternately rotating step, and the determining step again, if the eccentricity of the laundry detected in the determining step is greater than the preset value. However, because there may be such occasion that an operation time period of the washing machine is prolonged, or the washing machine is overloaded, if the foregoing steps are repeated for many times, the repetition of the foregoing steps are limited to a preset times, when the washing is ended. Once the determining step is passed, water in the inner tub 3 is discharged, and spinning is carried out. However, the supplementary determining step may be carried out additionally before the spinning step, for reducing the vibration of the washing machine, perfectly. In the supplementary determining step, though the spinning step is carried out directly of the eccentricity of the laundry is smaller than the preset value, if the eccentricity of the laundry is greater than the preset value, the supplementary control pattern is carried out.

In the meantime, the supplementary control pattern is provided for preventing vibration owing to the eccentricity greater than the preset value, i.e., excessive vibration of the tilt type washing machine during spinning in advance, operation of which embodiment will be explained.

Referring to FIGS. 6 and 7, in the supplementary control pattern, after draining water, the eccentricity of the laundry is detected again, to carry out a regular spinning directly, if the eccentricity of the laundry is smaller than the preset value. However, if the eccentricity of the laundry is greater than the preset value, water is supplied to the inner tub 3, a laundry disentangle alternate rotation is carried out, the determining step is carried out again, and the water is discharged if the determining step is passed, and the supplementary determining step is carried out again. However, because there may be such occasion that an operation time period of the washing machine is prolonged, or the washing machine is overloaded, if the foregoing steps are repeated for many times, the repetition of the foregoing steps are limited to a preset times, when the washing is ended. Provided that the foregoing series of processes are carried out, the spinning can be carried out smoothly because the eccentricity of the laundry is certainly smaller than the preset value when the operation proceeds to the spinning step.

In the meantime, it can be known that the aforementioned all steps of the present invention are applicable to the washing cycle including the water supplying step-the alternately rotating(washing) step-the water discharging step-the spinning step, and the rinsing cycle including a preset times of repetition of a series of steps having the water supplying step-the alternately rotating(rinsing) step-the water discharging step-the spinning step.

As has been explained, the method for controlling washing during spinning in a tilt-type washing machine for attenuation of vibration of the present invention has the following advantages.

Because the laundry is distributed evenly in the inner tub before the water discharge step, and the even distribution of the laundry is maintained during the water discharging step, the vibration of the washing machine can be reduced significantly when the operation proceeds to the spinning step.

In the meantime, the method for controlling washing during spinning in a tilt-type washing machine for attenuation of vibration in accordance with a second preferred embodiment of the present invention has the following advantage.

The determination of unbalance at first before the water discharge step is carried out results to a state water is in the inner tub always. That is, even if no water is supplied to the inner tub, the laundry disentangle alternately rotating step can be carried out smoothly for reducing the eccentricity of the laundry, which saves water actually, and shortens a washing time period, substantially.

And, all the advantages described in the detailed description of the preferred embodiment are included.

It will be apparent to those skilled in the art that various modifications and variations can be made in the method for controlling washing during spinning in a tilt-type washing machine for attenuation of vibration of the present invention without departing from the spirit or scope of the invention. Thus, it is intended that the present invention cover the modifications and variations of this invention provided they come within the scope of the appended claims and their equivalents.

What is claimed is:

1. A method for controlling washing during spinning in a tilt-type washing machine for attenuation of vibration, the method including a washing cycle having a water supplying step-an alternately rotating(washing) step-a water discharging step-a spinning step, a rinsing cycle having a preset times of repetition of a series of steps with a water supplying step-an alternately rotating(rinsing) step-a water discharging step-a spinning step, and a spinning cycle having a spinning step for carrying out a main water extraction, which are proceeded in a sequence, the method comprising:

(a) a main rotation step for exerting a centrifugal force to the laundry gathered to a center of the inner tub for spreading the laundry to an inside wall of the inner tub before the water discharging step;

(b) a laundry disentangle alternately rotating step for alternately rotating the inner tub for a preset times to disentangle the laundry spread to the inside wall of the inner tub; and, (c) a supplementary rotating step for rotating the inner tub at a preset RPM to keep the laundry in the tilted inner tub spread evenly during the water discharge step.

2. A method as claimed in claim 1, wherein the inner tub rotates alternately less than 10 times in the step (b).

3. A method as claimed in claim 1, wherein the supplementary rotating step includes the step of rotating the inner tub at $\omega=\sqrt{(2\ g\ \sin\theta/R}$ when a gravitational acceleration 'g sin θ' exerting to the laundry in the inner tub and an average radial acceleration '$(½)R\omega^2$', exerting to the laundry at a half way to the radius of the inner tub are equal, so that the laundry within a (½) area of the inner tub tends to move in a direction of the gravitational acceleration, and the laundry between (½)R and R area of the inner tub tends to move in a direction of the radial acceleration by a radial acceleration greater than the gravitational acceleration(or the average radial acceleration) and smaller than the maximum radial acceleration '$R\omega^2$, for spreading the laundry evenly, where 'R' denotes a radius of the inner tub and 'θ' denotes a tilt angle of the inner tub with respect to the ground.

4. A method as claimed in claim 3, wherein the present PRM is 30–50 RPM, when the radius 'R' of the inner tub is 0.25–0.3 m, and the tilt angle with respect to the ground is 10–15°.

5. A method as claimed in claim 1, wherein the preset RPM is 30–50 RPM, when the radius 'R' of the inner tub is 0.25–0.3 m, and the tilt angle with respect to the ground is 10–15°.

6. A method for controlling washing during spinning in a tilt-type washing machine for attenuation of vibration, the method including a washing cycle having a water supplying step-an alternately rotating(washing) step-a water discharging step-a spinning step, a rinsing cycle having a preset times of repetition of a series of steps with a water supplying step-an alternately rotating(rinsing) step-a water discharging step-a spinning step, and a spinning cycle having a spinning step for carrying out a main water extraction, which are proceeded in a sequence, the method comprising:

(a) a laundry disentangle alternately rotating step for alternately rotating the inner tub to eliminate the eccentricity of the laundry in the inner tub before the water discharge step; and, (b) a determining step either for carrying out a control pattern to eliminate the eccentricity of the laundry if the eccentricity of the laundry after the step (a) is greater than a preset value, or for proceeding to the water discharging step if the eccentricity of the laundry after the step (a) is smaller than the preset value.

7. A method as claimed in claim 6, wherein the control pattern includes the steps of:

carrying out the laundry disentangle alternately rotating step again for dropping the eccentricity of the laundry below the preset value, carrying out the determining step again, and automatically stopping the washing if the eccentricity of the laundry is kept greater than the preset value until the foregoing steps are repeated for a preset times.

8. A method as claimed in claim 6, wherein the control pattern includes the steps of:

determining an extent of the eccentricity and an eccentric position of the laundry, carrying out an optimal laundry disentangle alternately rotating step centered on the eccentric position of the laundry for dropping the eccentricity of the laundry below the preset value, carrying out the determining step again, and automatically stopping the washing if the eccentricity of the laundry is kept greater than the preset value until the foregoing steps are repeated for a preset times.

9. A method as claimed in claim 8, wherein the eccentric position of the laundry is determined to be as a region at which the angular speed of the inner tub is reduced by weight of the eccentric laundry itself when the eccentric laundry is moved upward, and increased by weight of the eccentric laundry itself when the eccentric laundry is moved downward.

10. A method as claimed in claim 6, wherein the extent of eccentricity is defined to be a size of oscillating component deviated from a fixed speed when the inner tub is rotated at the fixed speed.

11. A method as claimed in claim 6, further comprising the supplementary determining step before the spinning step, for carrying out the supplementary control pattern to eliminate the eccentricity of the laundry if the eccentricity is greater than the preset value after the water discharge step, or proceeding to the spinning step if the eccentricity is greater than the preset value after the water discharge step.

12. A method as claimed in claim 11, wherein the supplementary control pattern includes the steps of;

supplying water to the inner tub, carrying out the laundry disentangle alternately rotating step again for eliminating the eccentricity of the laundry, carrying out the determining step, again, carrying out the water discharging step, again, carrying out the supplementary determining step again, and automatically stopping the washing if the eccentricity of the laundry is kept greater than the preset value until the foregoing steps are repeated for a preset times.

13. A method as claimed in claim 6, further comprising a step for rotating the inner tub at 30–50 RPM to keep the laundry in the tilted inner tub spread evenly during the water discharge step.

*14. A method for controlling attenuation of vibration in a tilt-type washing machine having an inner tub, the method comprising, in the following order:*

*a) a laundry disentangle alternately rotating step to alternately rotate the inner tub to eliminate eccentricity of laundry in the inner tub without water discharge and before a main water extraction and after a washing step or rinsing step; and*

*b) a determining step to proceed to the main water extraction step if the eccentricity of the laundry after the step (a) is smaller than a preset value.*

*15. The method as claimed in claim 14, wherein the inner tub rotates alternately less than 10 times in the step (a).*

*16. The method as claimed in claim 14, further comprising;*

*carrying out the laundry disentangle alternately rotating step again to lower the eccentricity of the laundry below the preset value if the eccentricity of the laundry after the step (a) is greater than the preset value;*

*carrying out the determining step again; and automatically stopping the washing if the eccentricity of the laundry is kept greater than the preset value until the foregoing steps are repeated for a preset times.*

*17. The method as claimed in claim 14, further comprising rotating the inner tub at 30-50 RPM to keep the laundry in the tilted inner tub spread evenly.*

*18. A method for controlling attenuation of vibration in a tilt-type washing machine having an inner tub, the method comprising, in the following order:*

*a) alternately rotating the inner tub to disentangle laundry and eliminate eccentricity of laundry in the inner tub without water discharge and before a main water extraction and after a washing step or rinsing step; and*

*b) determining if the eccentricity of the laundry after the alternately rotating is smaller than a preset value.*

*19. The method for controlling attenuation of vibration in a tilt-type washing machine as set forth in claim 18, and further alternately rotating the inner tub to disentangle laundry and eliminate eccentricity of the laundry in the inner tub before a main water extraction if the eccentricity of the laundry after the alternately rotating is greater than the preset value.*

*20. The method for controlling attenuation of vibration in a tilt-type washing machine as set forth in claim 19, and further determining if the eccentricity of the laundry after the alternately rotating is smaller than a preset value.*

*21. The method as claimed in claim 18, wherein the inner tub rotates alternately less than 10 times in the step (a).*

*22. The method as claimed in claim 18, further comprising;*

*carrying out the laundry disentangle alternately rotating step again to drop the eccentricity of the laundry below the preset value if the eccentricity of the laundry after the step (a)* is greater than the preset value;

*carrying out the determining step again; and*

*automatically stopping the washing if the eccentricity of the laundry is kept greater than the preset value until the foregoing steps are repeated for a preset times.*

*23. The method as claimed in claim 18, further comprising rotating the inner tub at 30-50 RPM to keep the laundry in the tilted inner tub spread evenly.*

*24. A method for controlling attenuation of vibration in a tilt-type washing machine having an inner tub, the method comprising, in the following order:*

*a) alternately rotating the inner tub to disentangle laundry and eliminate eccentricity of laundry in the inner tub without water discharge and before a main water extraction, and after a washing step or rinsing step and prior to a sensing of the eccentricity; and*

*b) determining if the eccentricity of the laundry after the alternately rotating is smaller than a preset value.*

*25. The method for controlling attenuation of vibration in a tilt-type washing machine as set forth in claim 24 and further alternately rotating the inner tub to disentangle laundry and eliminate eccentricity of the laundry in the inner tub before a main water extraction if the eccentricity of the laundry after the alternately rotating is greater than the preset value.*

*26. The method for controlling attenuation of vibration in a tilt-type washing machine as set forth in claim 25, and further determining if the eccentricity of the laundry after the alternately rotating is smaller than a preset value.*

*27. The method as claimed in claim 24, wherein the inner tub rotates alternately less than 10 times in the step (a).*

*28. The method as claimed in claim 24, further comprising;*

*carrying out the laundry disentangle alternately rotating step again to drop the eccentricity of the laundry below the preset value if the eccentricity of the laundry after the step (a)* is greater than the preset value;

*carrying out the determining step again; and*

*automatically stopping the washing if the eccentricity of the laundry is kept greater than the preset value until the foregoing steps are repeated for a preset times.*

*29. The method as claimed in claim 24, further comprising rotating the inner tub at 30-50 RPM to keep the laundry in the tilted inner tub spread evenly.*

*30. A method for controlling attenuation of vibration in a tilt-type washing machine having an inner tub, the method comprising:*

*a) a main rotation step to exert a centrifugal force to laundry gathered to a center of the inner tub to spread the laundry to an inside wall of the inner tub before a main water extraction;*

*b) a laundry disentangle alternately rotating step to alternately rotate the inner tub for a preset number of times without water discharge to disentangle the laundry spread to the inside wall of the inner tub; and*

*c) a supplementary rotating step for rotating the inner tub at a preset RPM to keep the laundry in the tilted inner tub spread evenly, while concurrently discharging water.*

*31. A method for controlling attenuation of vibration in a tilt-type washing machine having an inner tub, the method comprising, in the following order:*

*a) alternately rotating the inner tub to disentangle laundry and eliminate eccentricity of laundry in the inner tub without water discharge before a main water extraction, and after a washing step or rinsing step;*

*b) determining if the eccentricity of the laundry after the alternately rotating is smaller than a preset value; and*

*c) supplying water if the eccentricity of the laundry is less than the preset value.*

*32. The method as claimed in claim 31, further comprising a water discharge step before the step (c).*

*33. A method for controlling attenuation of vibration in a tilt-type washing machine having an inner tub, the method comprising, in the following order:*

*a) alternately rotating the inner tub to disentangle laundry and eliminate eccentricity of laundry in the inner tub without water discharge before a main water extraction, and after a washing step or rinsing step;*

*b) determining if the eccentricity of the laundry after the alternately rotating is smaller than a preset value;*

*c) carrying out the step (a) again if the eccentricity of the laundry is greater than the preset value;*

*d) carrying out the step (b) again; and*

*e) automatically stopping the washing if the eccentricity of the laundry is kept greater than the preset value until the foregoing steps are repeated for a preset number of times.*

* * * * *